United States Patent
Bury (10) Patent No.: US 7,469,868 B2
(45) Date of Patent: Dec. 30, 2008

(54) VACUUM SUCTION CUP, ESPECIALLY FOR A WINDSHIELD OF A MECHANICAL VEHICLE

(75) Inventor: Henryk Bury, Mielec (PL)

(73) Assignee: Bury Sp. z o.o., Mielec (PL)

( * ) Notice: Subject to any disclaimer, the term of this patent is extended or adjusted under 35 U.S.C. 154(b) by 24 days.

(21) Appl. No.: 11/623,410

(22) Filed: Jan. 16, 2007

(65) Prior Publication Data

US 2008/0023602 A1    Jan. 31, 2008

(30) Foreign Application Priority Data

Jul. 12, 2006    (EP)    ................................. 06460021

(51) Int. Cl.
    *F16B 47/00*    (2006.01)
(52) U.S. Cl. ................. 248/205.8; 248/206.2
(58) Field of Classification Search ... 248/205.5–205.9, 248/206.1, 206.2, 206.3, 206.4, 362, 363
    See application file for complete search history.

(56) References Cited

U.S. PATENT DOCUMENTS

| | | | | |
|---|---|---|---|---|
| 4,505,446 A | * | 3/1985 | Roder | ..................... 248/205.8 |
| 5,065,973 A | * | 11/1991 | Wang | .......................... 248/362 |
| 5,366,129 A | * | 11/1994 | Nakamura et al. | ............. 225/42 |
| 5,970,860 A | * | 10/1999 | Yip | .............................. 99/510 |
| 6,666,420 B1 | | 12/2003 | Carnevali | |
| 6,932,306 B2 | * | 8/2005 | Zou et al. | ................ 248/205.5 |
| 7,264,197 B2 | * | 9/2007 | Yu | .......................... 242/597.7 |

FOREIGN PATENT DOCUMENTS

| | | |
|---|---|---|
| DE | 9112441 U1 | 1/1992 |
| EP | 0096379 A2 | 12/1983 |

* cited by examiner

*Primary Examiner*—Korie H. Chan
(74) *Attorney, Agent, or Firm*—Matthias Scholl P.C.; Matthias Scholl (57) ABSTRACT

A push button or turning type vacuum suction cup, especially for a windshield of mechanical vehicles comprising an elastic suction cup (1), integrally connected with a guiding spindle (2), a dome (3) connected with a guiding bushing (4), a return spring (5), and a guiding pin (6) in a transverse hole (7) of the guiding spindle (2). The push button suction cup has a push button (8) with guiding grooves (9) on its both side walls (8') and sliding within a housing (10) of the suction cup. The turning suction cup has the guiding bushing (4) provided with cam surfaces (11) and a knob (12) fastened to the dome (3). The guiding pin (6) being forced into the transverse hole (7) of the guiding spindle (2) of the suction cup (1) is guided directly along guiding grooves (9) or cam surfaces (11) inside the housing (10, 12) of the suction cup.

10 Claims, 6 Drawing Sheets

VACUUM SUCTION CUP, ESPECIALLY FOR A WINDSHIELD OF A MECHANICAL VEHICLE

CROSS-REFERENCE TO RELATED APPLICATIONS

This application claims priority to the European Patent Application No. EP06460021 filed Jul. 12, 2006, the contents of which are incorporated herein by reference.

BACKGROUND OF THE INVENTION

1. Field of the Invention

This invention relates to a vacuum suction cup, especially for a windshield of a mechanical vehicle, provided with an elastic suction cup with a spindle protruding axially therefrom. The spindle slides axially within a guiding bushing of a dome which shields the suction cup from outside.

2. Description of the Related Art

An automotive and other mechanical vehicles equipment market experiences currently tremendous growth in a number of a diverse electronic equipment, e.g. navigation devices, mobile phones, TV screens and others, as supplementary devices installed in mechanical vehicles. Such equipment is commonly attached by various holders and brackets as well as vacuum suction cups onto a windshield of the mechanical vehicle. Thus several new designs of vacuum suction cups have been released recently to the market. They are both to provide reliable connection of a bracket with the windshield, and, on the other hand, they are to be easily fastened and unfastened from the windshield of the vehicle.

European patent EP 133808 describes a vacuum suction cup connected to a holder, composed of elastic concave suction cup, which circumference adheres to a flat and smooth surface, e.g. a glass pane. The suction cup has a threaded pin protruding from its external surface. The suction cup is covered by an intermediate member in the form of a dish or dome, which adjoins the cup around the circumference. The dome has a threaded hole which is fastened to the threaded pin of the suction cup. Once tightened, the dome covers the suction cup over its circumference completely. The dome is provided with protruding axial pin terminated with a flange for suspending an object. Once the suction cup is pressed against the pane surface, where the suction cup is to be fixed, one fastens the dome over the protruding threaded pin, which generates a vacuum between the pane and the suction cup, which in turn fastens the suction cup to the smooth surface of the pane. To unfasten the vacuum suction cup from the pane, one has to tighten the dome more over the threaded pin of the suction cup, which in turn makes it to tear off the flat and smooth pane.

British patent GB 2420147A relates to a vacuum suction cup provided with an elastic suction cup, which once pressed, fastens reliably on a flat and smooth surface, e.g. a pane. There is a pin with a threaded hole, protruding outwards and located in a central thickened area of the suction cup. There is a suction cup covering dome fitted with a threaded spindle pointing downwards, located directly on the suction cup. The threaded spindle in the covering dome fastens to the threaded hole in the pin of the suction cup. To facilitate gripping of the dome at fastening, butterfly type grips are found on the external surface. A pin protruding from the dome is used for suspending an object.

Once the suction cup is pressed against a pane, the suction cup flattens and the pin fastening of the dome to the suction cup makes it to rise, which generates under pressure in the zone between the suction cup and the pane, which in turn fastens the suction cup to the pane. The suction cup clings to the pane over entire circumference, so even loads applied eccentrically by an object suspended on the pin do not make it to tear off the flat and smooth surface of the pane. To unfasten the vacuum suction cup, one has to loosen the dome to make the suction cup to adhere to the pane over entire area, and to loosen the suction cup.

German utility model DE 202004010999U1 describes a stand or hanger provided with a vacuum suction cup connected by means of an elastic metal tube in plastic shielding with a holder for hanging an object on. The elastic concave suction cup has a threaded pin to fasten a nut to. A dome is attached to the lower surface of the nut. The dome with its circumference rests on the outer surface of the suction cup. The elastic tube on the suction cup side terminates with a clamp, which, as its internal depressions match with the nut sides, makes the nut to turn when turning the elastic tube. When the suction cup is applied to a flat and smooth surface, e.g. a pane, after few turns of the flexible tube the nut causes the pin in the suction cup to go off the flat and smooth surface of the pane, which generates under pressure keeping the suction cup in place. Then a suitable object can be placed on the stand or hanger attached to the suction cup.

All known designs of suction cups are of marked inconvenience, as the suction cup pin moves along its axis due to external or internal thread, it is necessary to complete one or more full turns of the dome which threaded hole with the threaded pin is fastened to, in order to move the spindle by a distance required to attach the suction cup reliably. In order to eliminate this inconvenience, there are suction cups released to the market recently, where the spindle protruding from the suction cup is provided with guiding pins, moving along the suction cup axis by one-arm handle rotating freely within the suction cup.

European patent EP 1457690 discloses a stand or hanger provided with a vacuum suction cup on one side and a handle to suspend an object on the other side. Both parts are connected by a flexible bar covered by a plastic shielding, which allows one to attach an object in any place and position relative to a flat and smooth surface, e.g. a windshield of a mechanical vehicle. The suction cup is provided with a protruding spindle, formed integrally with the flexible bar. The suction cup spindle has a transverse hole, where a pin protrudes from. There is also an axial hole containing a helical spring, which presses the suction cup against the windshield. A pin passes through the transverse hole in the suction cup, through longitudinal holes formed in walls of a suction cup support as well as through an axial hole in a single arm lever. The lever rotates around the pin, while supported on its cam surface by the external surface of the support. As the lever rises, it loads the spring and makes the suction cup to go off the flat and smooth pane surface and generates a vacuum between the suction cup and the pane. The vacuum keeps the suction cup in place firmly.

German utility model DE 202005014289U1 relates to a bracket with a vacuum suction cup for mounting on a flat and smooth surface, e.g. wall or pane. The suction cup of the bracket comprises an elastic suction cup, which adheres with its entire circumference to the flat and smooth surface, e.g. a pane, and a round dome covering the suction cup with its entire circumference. The bracket for hanging an object protrudes from the dome, and it is provided with hollow joints, which makes possible to attach any object in any convenient angular position. There is a sliding pin in longitudinal holes on sides of the bracket, which passes through a spindle protruding from the suction cup. There is also a helical spring above the spindle, which pushes the suction cup off the internal surface of the dome. A pin located in the spindle of the suction cup engages with elongated holes in walls of the bracket and with one-arm angular lever. The lever is provided with a cam surface resting on the external surface of the dome. When the lever is in its risen position it releases the helical spring, which presses the suction cup against the flat and smooth surface of the pane or wall. In a depressed position the lever compresses the spring, and, through the pin, makes the spindle of the suction cup to rise and generate vacuum below it and the flat and smooth surface of the pane.

Placing both the pin and slit in the dome outside the suction cup is the main inconvenience of both designs, as both parts might be easily broken. Moreover, such suction cups are inconvenient in operation as in order to attach it, it is necessary to press the suction cup against the pane with one hand, and at the same time to turn the lever by the other hand.

SUMMARY OF THE INVENTION

It is an objective of the invention to provide a suction cup, especially for windshields of mechanical vehicles, where a mechanism displacing a spindle of the suction cup would be entirely enclosed by the suction cup housing, and where only one hand is required for attaching it.

According to the invention there is provided a vacuum suction cup, especially for a windshield of a mechanical vehicle, provided with an elastic suction cup with a spindle protruding axially therefrom, wherein the spindle slides within a guiding bushing of a dome, which shields the suction cup from outside. The suction cup is characterized in that a guiding pin forced into a transverse hole of a guiding spindle of an elastic suction cup, is guided directly along guiding grooves or cam surfaces inside a housing of the suction cup.

It is preferred that the suction cup of the push-button type has a push-button sliding within the housing and provided with guiding grooves on its both side walls, along which both ends of the guiding pin slide. The guiding pin is forced into the transverse hole of the spindle of the suction cup.

Desirably, guiding grooves formed on the side walls of the push button are in their lower portion inclined in relation to a push button axis at an angle ranging from 10° to 30°, and terminate in their upper portion as parallel to that axis.

In accordance with another embodiment of the invention, which is a rotating type suction cup, the guiding bushing of the dome is provided with two circumferential cam surfaces cooperating with both ends of the pin being forced into the transverse hole of the spindle of the suction cup, wherein the dome is connected with a knob forming the housing of the suction cup.

By a preferred design of the suction cup, cam surfaces around the circumference of the guiding bushing cover an angle of about 90° and are inclined in relation to a plane perpendicular to an axis of the bushing at an angle ranging from 10° to 45°.

Further, cam surfaces in their upper portion have a locating groove of a diameter slightly greater than a diameter of the pin.

The dome is preferably provided with screws to be fastened in the holes located in the knob.

Advantageously, the dome has fastening screws being screwed into holes of the knob.

The vacuum suction cup according to the invention can be easily fastened to a windshield of a mechanical vehicle by a single hand. The fastening is done by pressing the suction cup against the windshield and turning the knob, or pressing the push-button by the thumb at the same time. The suction cup can be also easily unfastened from the windshield by a single hand.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

The following references are used in the drawings: 1—an elastic suction cup; 2—a guiding spindle of the suction cup; 3—a dome covering the suction cup; 4—a guiding bushing of the dome 3; 5—a helical return spring acting on the guiding spindle 2; 6—a guiding pin forced into a hole 7 of the spindle 2; 7—a transverse hole in the guiding spindle 2; 8—a push button of the suction cup 1; 8'—side walls of the push button 8; 9—guiding grooves on side walls 8' of the push button 8; 10—a suction cup housing; 11—circumferential cam surfaces on the front surface of the guiding bushing 4; 12—a knob; 13—screws for fastening the knob 12 to the guiding dome 3; 14—a transverse groove locating both ends of the cam surfaces; 11—projections of the knob 12; $\alpha$—an angle of inclination of grooves 9 on side walls 8' of the push button 8; $\beta$—an angle of inclination of cam surfaces in relation to a cross-section of the guiding bushing 4.

DETAILED DESCRIPTION OF THE INVENTION

A push-button type suction cup as shown in FIGS. 1 to 5 comprises the following basic elements: an elastic suction cup 1, integrally connected with a guiding spindle 2, a dome 3, provided with a guiding bushing 4 protruding from its external surface, a return spring 5, a guiding pin 6, forced into a transverse hole 7 of the guiding spindle 2, and a push button 8 with guiding grooves 9 on its both side walls 8' and sliding within a housing 10 of the suction cup. The housing 10 is preferably connected with a joint provided with a mounting arm (not shown). The joint is used for suspending various electronic equipment (e.g. mobile phones, TV sets, navigation equipment, meteo equipment etc.), attached to a windshield of a mechanical vehicle.

The guiding pin 6, forced into the transverse hole 7 of the guiding spindle 2 of the suction cup 1, is mounted in guiding grooves 9 of the push button 8 on its both sides. Guiding grooves 9 are inclined in relation to the push button axis at the angle $\alpha$ ranging from 10° to 30°, and terminate in its upper portion as parallel to that axis. Thus pressing the push button 8 at the initial phase of its movement makes the guiding spindle 2 together with the suction cup 1 to move towards the pane, and at the final phase, the guiding spindle 2 with the suction cup 1 are set distant from the pane, which makes the suction cup to fasten.

Figure 1:
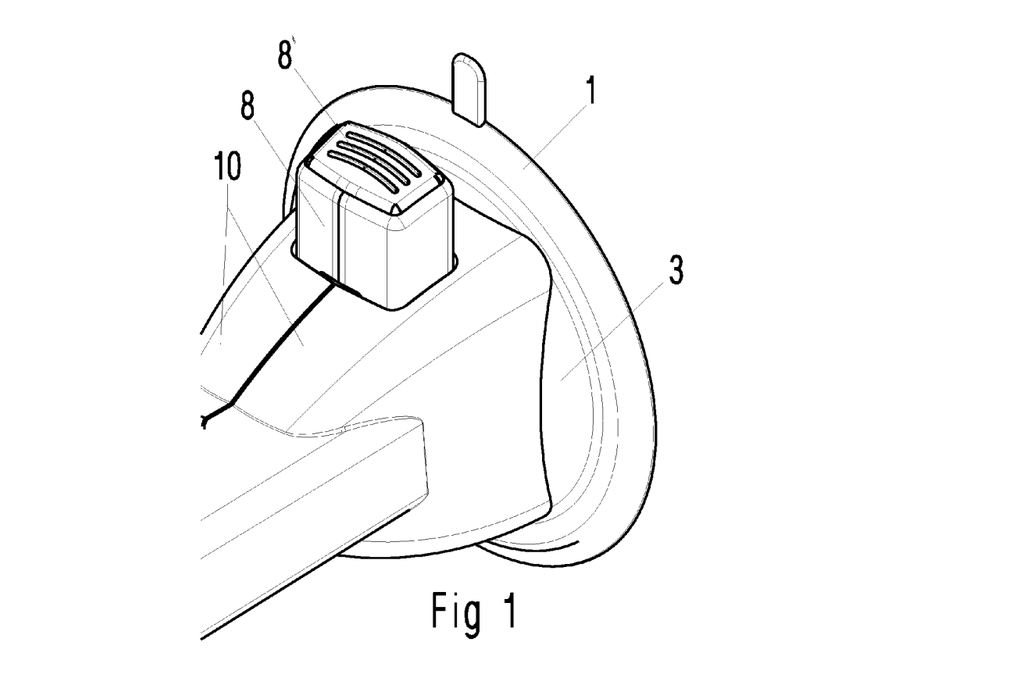
FIG. 1 is a perspective view of a push-button type suction cup in the as-pressed state.
Figure 2:
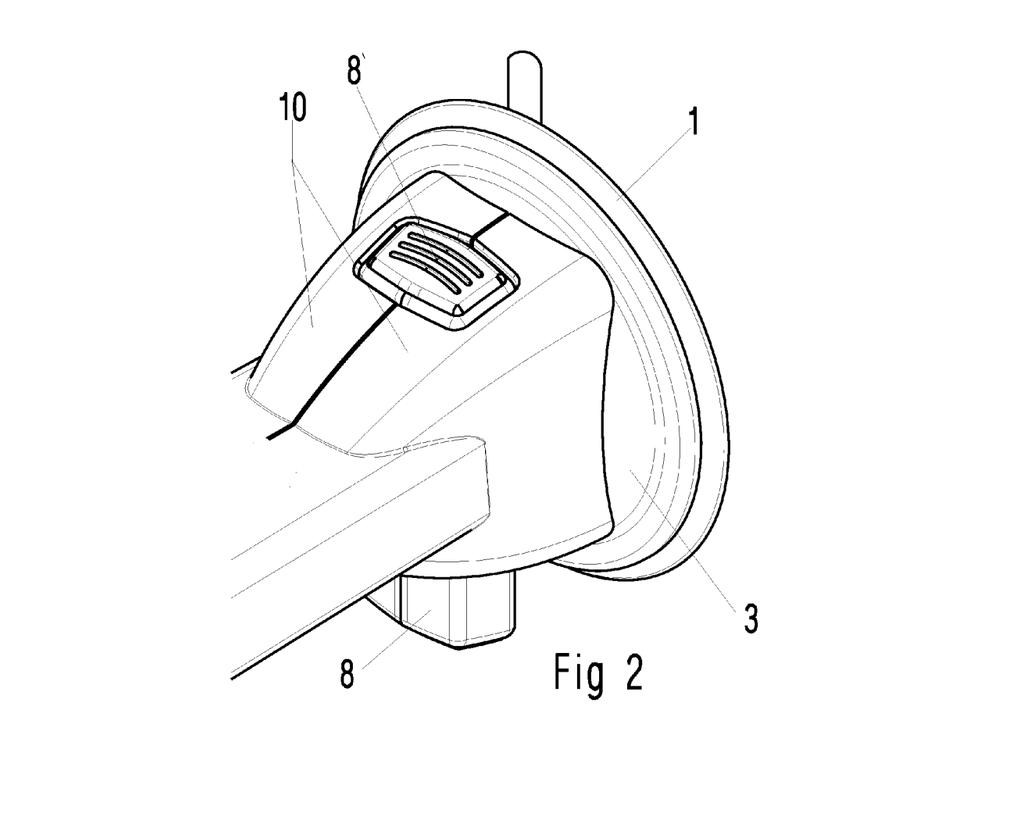
FIG. 2 is a perspective view of the suction cup in the as-fastened state.
Figure 3:
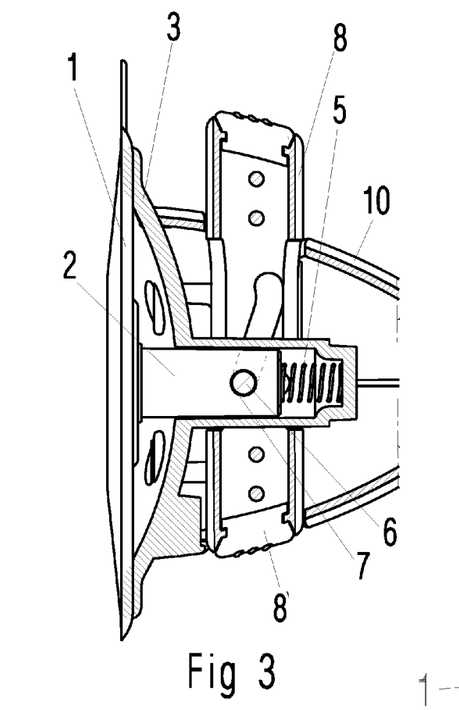
FIG. 3 is a cross-sectional view of the suction cup in the as-pressed state.
Figure 4:
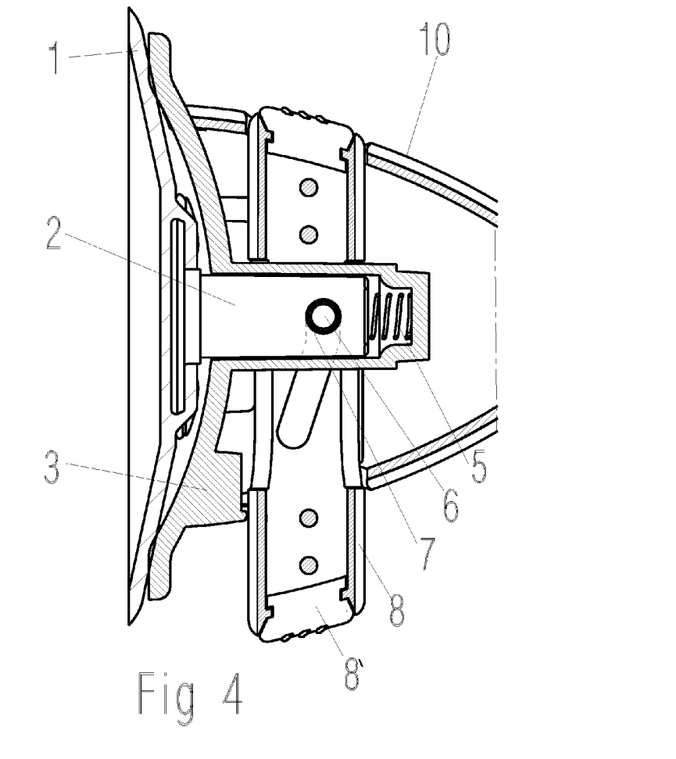
FIG. 4 is a cross-sectional view of the suction cup of FIG. 3 in the as-fastened state.
Figure 5:
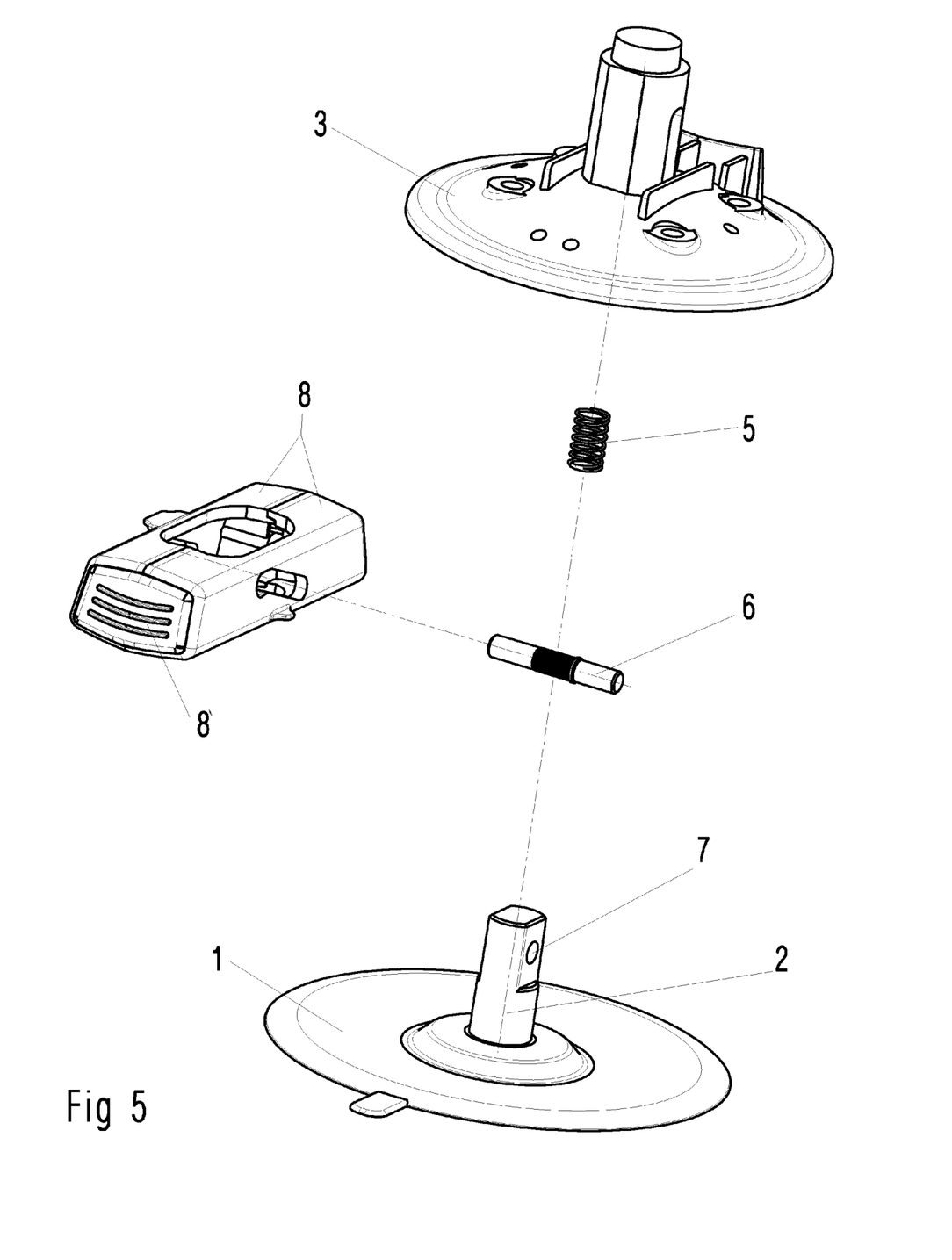
FIG. 5 is an exploded view of main components of the push-button type suction cup.
Figure 6:
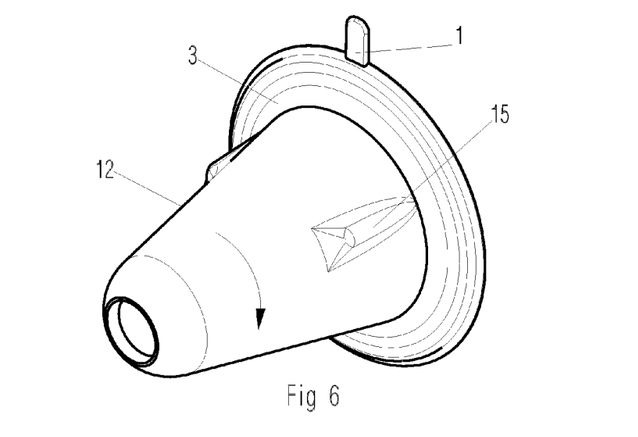
FIG. 6 is a perspective view of a rotating-type suction cup.

The push-button type suction cup as shown in FIGS. 1 to 5 operates as follows. While holding the suction cup by a hand, when its push button is set as shown in FIGS. 1 and 3, the suction cup 1 is first pressed against the windshield of the mechanical vehicle and then, at such setting state, the push-button 8 is pressed down by the same hand. The perpendicular movement of the push button 8 in its initial phase, corresponding to the inclined portion of guiding grooves 9, makes the guiding pin 6 guided by grooves as well as the spindle 2 connected to it, including the suction cup 1, to move towards the windshield, and to fasten the suction cup 1. In the as-fastened position (see FIGS. 2 and 4), the guiding pin 6 is in the portion of the guiding groove 9 parallel to the windshield, which keeps the suction cup in the as-fastened position.

The suction cup is unfastened by holding it with one hand, and by pushing up the push button 8 with the thumb simultaneously. Due to the action of the return spring 5 and the elastic action of the suction cup 1, the push button 8 is automatically set into up position and simultaneously the spindle 2 with the suction cup 1 are set into a released position.

A suction cup of another aspect of the invention, which is a turning-type, as shown in FIGS. 6 to 9, comprises the following basic parts: an elastic suction cup 1, connected with or made integral with a spindle 2 protruding axially, provided with a transverse hole 7, inside which a guiding pin 6 is forced, a dome 3, connected with a guiding bushing 4 protruding from its external surface and having two cam surfaces 11 around its circumference, and a knob 12, which is fastened to the dome 3 by screws 13 and forms a suction cup housing. Both cam surfaces 11, cut over the front surface of the guiding bushing 4, are made in the form of a helical line, inclined in relation to the plane perpendicular to a bushing axis at the angle α of 10° to 45°. Each cam surface 11 corresponds to the central angle of 90° and terminates on its upper side with a locating groove 14 of a diameter slightly greater than that of the pin 6. Both cam surfaces 11 of the bushing 4 cooperate with protruding ends of the guiding pin 6, forced into the transverse hole 7 of the spindle 2 of the suction cup 1. To facilitate turning of the knob 12, there are external projections 15 thereon. The knob 12 is also provided with holes 16 for fastening screws 13, which connect the knob with the dome 3.

Figure 8:
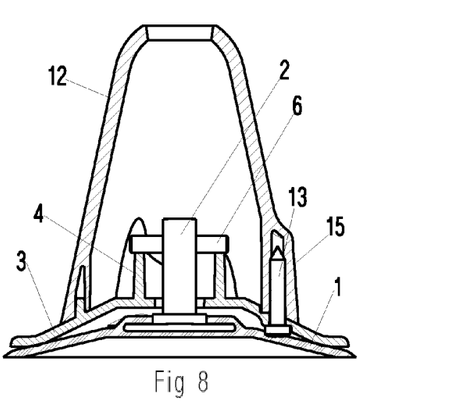
FIG. 8 is a cross-sectional view of the suction cup of FIG. 6 in the as-fastened state.
Figure 9:
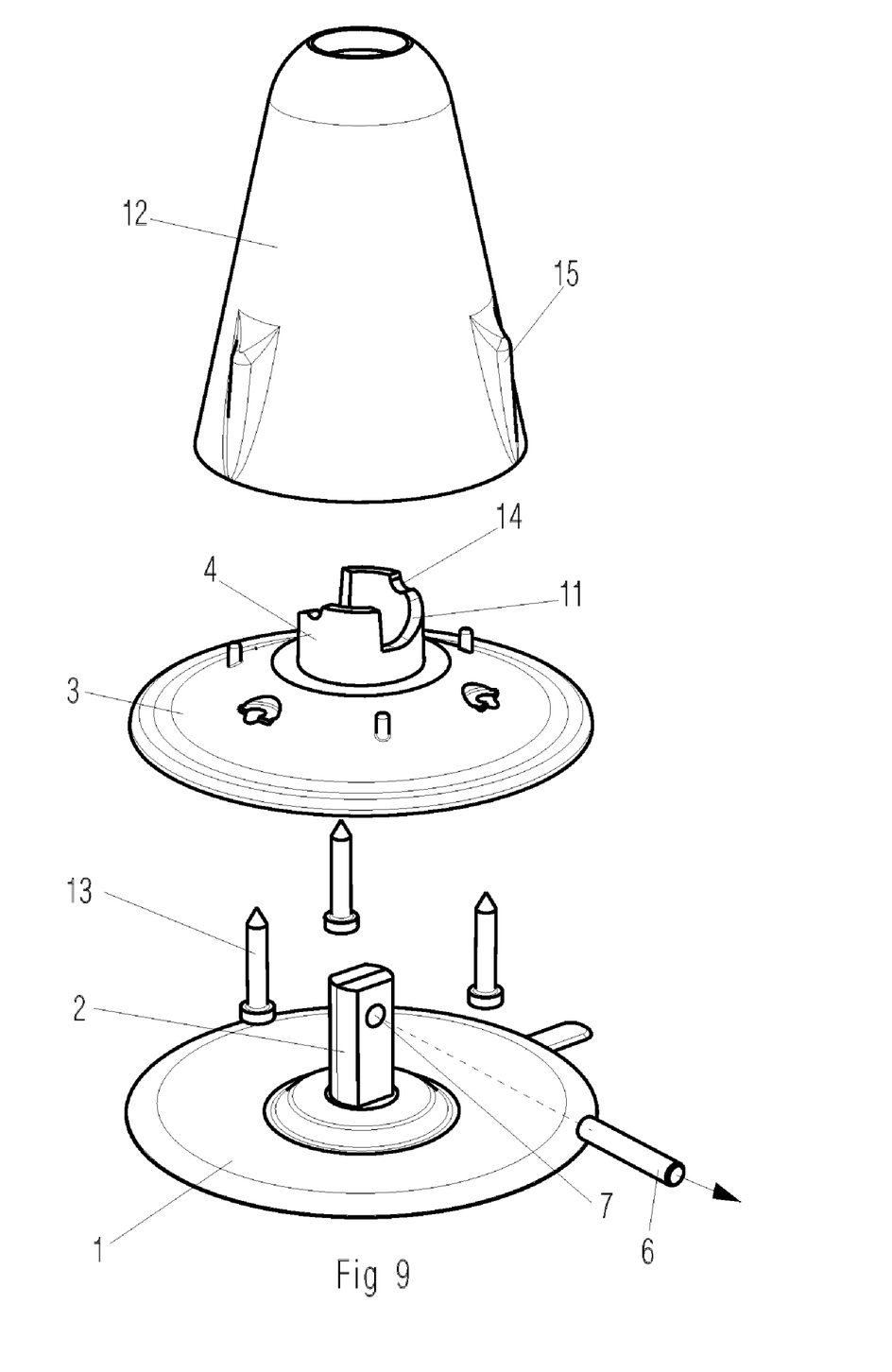
FIG. 9 is an exploded view of main components of the suction cup of FIG. 6.
Figure 10:
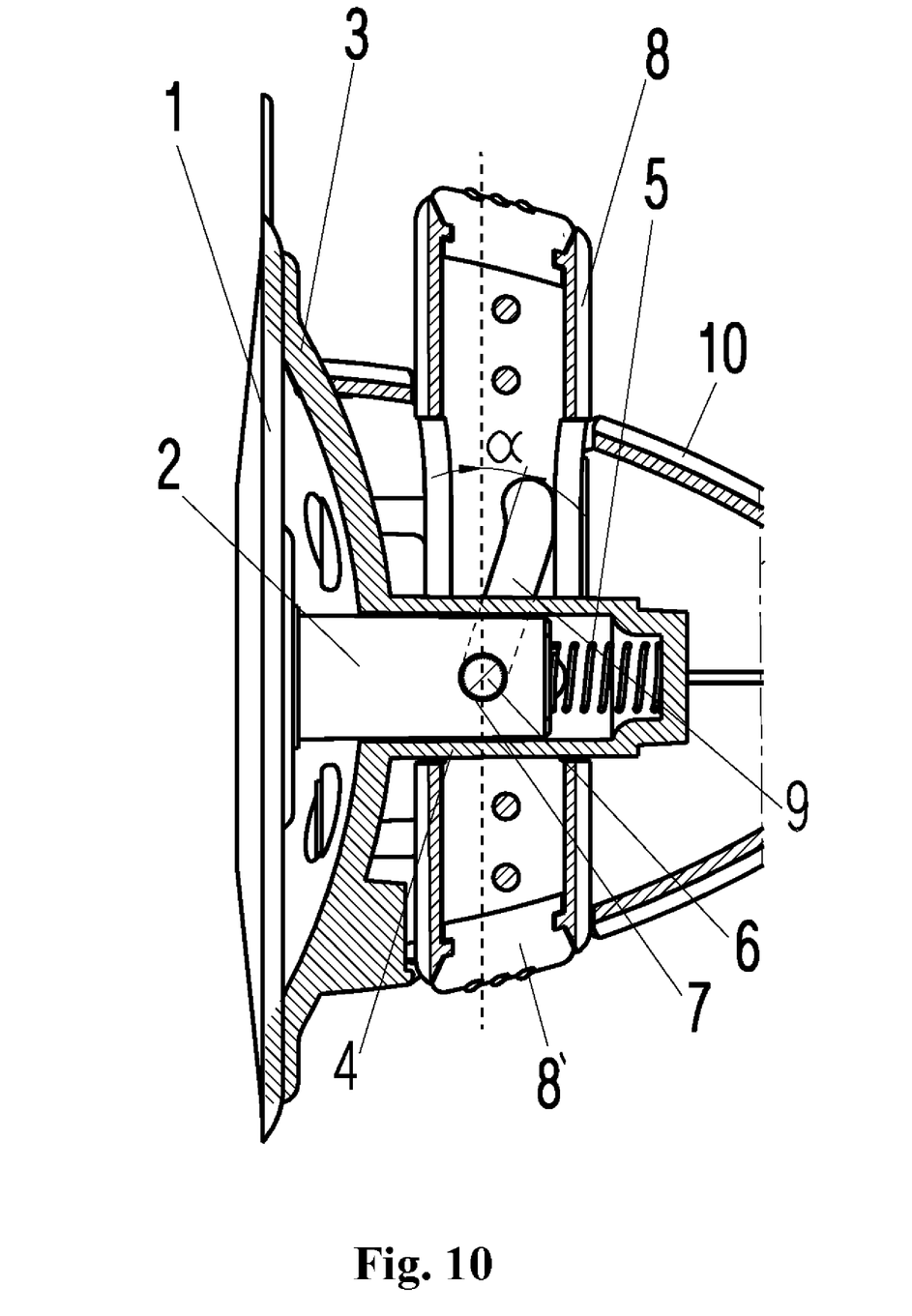
FIG. 10 is a cross-sectional view of the suction cup in the as-pressed state illustrating the angle $\alpha$.

The vacuum suction cup of the rotating type operates as follows. While holding the suction cup, one has to press the suction cup 1 against the windshield, and, at the same time, to turn the knob 12 clockwise with the same hand. Thus the ends of the guiding pin 6 sliding on cam surfaces 11 make the spindle 2 together with the suction cup 1 to move towards the windshield. Once a quarter turn is completed, the ends of the guiding pin 6 engage with locating grooves 14 forming a termination of cam surfaces 11 and set the spindle 2 together with the suction cup 1 in the as-fastened position (FIG. 8).

Figure 7:
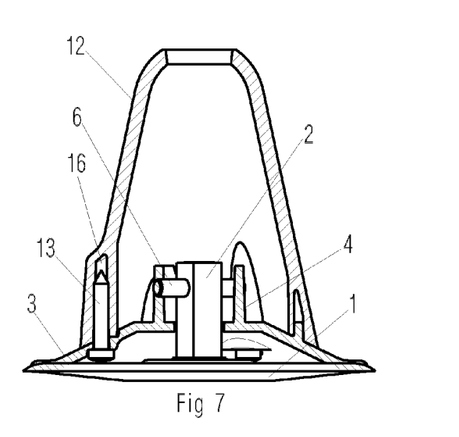
FIG. 7 is a cross-sectional view of the suction cup of FIG. 6 in the as-pressed state.

The suction cup is unfastened by turning the knob 12 counter clockwise. Thus the ends of the guiding pin 6 disengage locating grooves 14 and slide downwards over cam surfaces 11, where the suction cup 1 is set in the released position (FIG. 7).

The invention is not limited to the embodiments disclosed herein. Within the scope of the invention different modifications or alternations will be conceivable to those skilled in the art.

What is claimed is:

1. A vacuum suction cup, especially for a windshield of a mechanical vehicle, provided with an elastic suction cup with a spindle protruding axially therefrom, wherein said spindle slides within a guiding bushing (4) of a dome (3), which shields said suction cup from outside, characterized in that a guiding pin (6) being forced into a transverse hole (7) of said guiding spindle (2) of said suction cup (1) is guided directly along guiding grooves (9) or cam surfaces (11) inside a housing (10, 12) of said suction cup, and characterized in that it further includes a push button (8) sliding within said housing (10) and provided with guiding grooves (9) on its both side walls (8') along which slide both ends of said guiding pin (6) forced into said traverse hole (7) of said spindle (2) of said suction cup (1).

2. The suction cup according to claim 1, characterized in that said guiding grooves (9) formed on the side walls (8') of said push button (8) are in their lower portion inclined in relation to a push button axis at an angle (α) ranging from 10° to 30°, and terminate in their upper portion as parallel to that axis.

3. The suction cup according to claim 1, characterized in that said guiding bushing (4) of said dome (3) is provided with two circumferential cam surfaces (11) cooperating with both ends of said pin (6) being forced into said transverse hole (7) of said spindle (2) of said suction cup (1), wherein said dome (3) is connected with a knob (12) forming said housing of said suction cup.

4. The suction cup according to claim 3, characterized in that said cam surfaces (11) around said circumference of said guiding bushing (4) cover an angle of about 90° and are inclined in relation to a plane perpendicular to an axis of said bushing (4) at an angle (β) ranging from 10° to 45°.

5. A suction cup according to claim 4, characterized in that said cam surfaces (11) in their upper portion have a locating groove (14) of a diameter slightly greater than a diameter of said pin (6).

6. A vacuum suction cup, especially for a windshield of a mechanical vehicle, provided with an elastic suction cup with a spindle protruding axially therefrom, wherein said spindle slides within a guiding bushing (4) of a dome (3), which shields said suction cup from outside, characterized in that a guiding pin (6) being forced into a transverse hole (7) of said guiding spindle (2) of said suction cup (1) is guided directly along guiding grooves (9) or cam surfaces (11) inside a housing (10, 12) of said suction cup, and characterized in that said guiding bushing (4) of said dome (3) is provided with two circumferential cam surfaces (11) cooperating with both ends of said pin (6) being forced into said transverse hole (7) of said spindle (2) of said suction cup (1), wherein said dome (3) is connected with a knob (12) forming said housing of said suction cup, and characterized in that said dome (3) has fastening screws (13) being screwed into holes (16) of said knob (12).

7. A vacuum suction cup, especially for a windshield of a mechanical vehicle, provided with an elastic suction cup with a spindle protruding axially therefrom, wherein said spindle slides within a guiding bushing of a dome, which shields said suction cup from outside, and also provided with a sliding element, which slides perpendicularly to the axis of the said spindle and has a guiding surface inclined towards the direction into which the element slides; characterized in that the housing (10) of the suction cup is provided with a push-button (8), which slides perpendicularly to the axis of the vacuum suction cup and, on its both side walls (8'), is provided with guiding grooves (9), inclined towards the direction into which the push-button slides, and along which both ends of a guiding pin (6), which is forced into a transverse hole (7) of a guiding spindle (2) of an elastic suction cup (1), slide.

8. The suction cup according to claim 7, characterized in that said guiding grooves (9) formed on the side walls of said push button are in their lower portion inclined in relation to a push button (8) axis at an angle (α) ranging from 10° to 30°, and terminate in their upper portion as parallel to that axis.

9. The suction cup according to claim 7, characterized in that dome (3) fastening the circumference of the elastic suction cup (1) is connected to the guiding bushing (4), within which the guiding spindle (2) of the suction cup (1) slides.

10. The suction cup according to claim 9, characterized in that the guiding bushing (4) is provided with a helical spring (5), which presses the end face of the guiding spindle (2) of the suction cup (1).

* * * * *